Feb. 8, 1927.
H. H. ARMSTRONG
1,616,840
DISTILLING AND REFLUXING UNIT
Filed Dec. 26, 1923   2 Sheets-Sheet 2
Fig. 2.
Fig. 3.
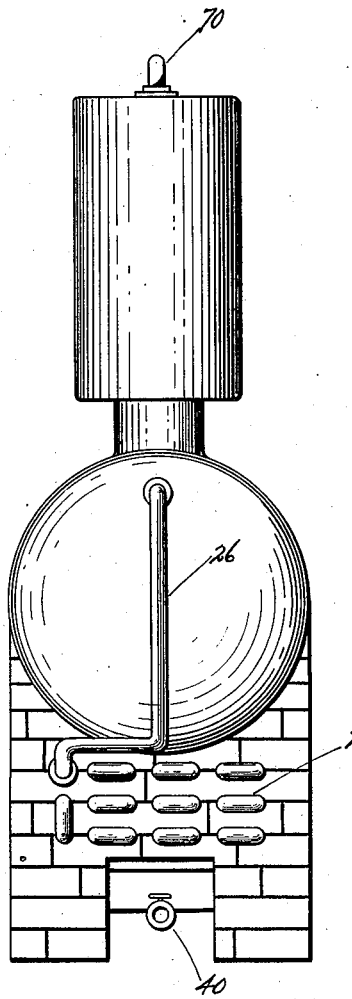
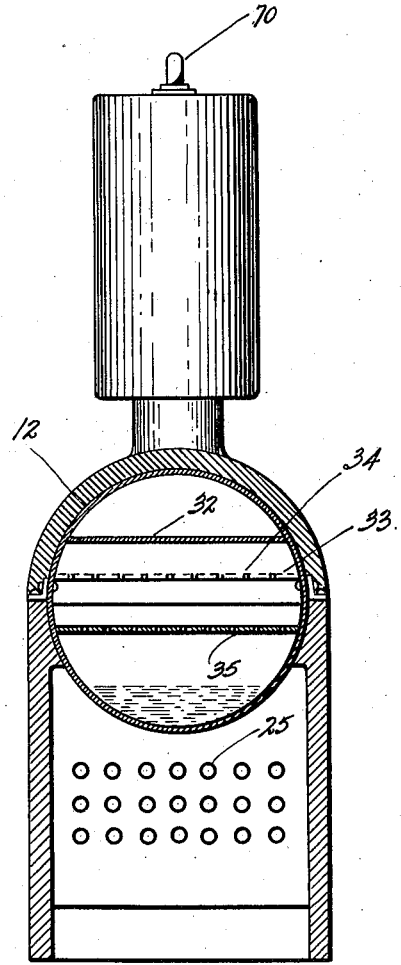
INVENTOR:
HARRY H ARMSTRONG.
BY Graham + Davis
ATTORNEYS:

Patented Feb. 8, 1927.

1,616,840

UNITED STATES PATENT OFFICE.

HARRY H. ARMSTRONG, OF LOS ANGELES, CALIFORNIA.

DISTILLING AND REFLUXING UNIT.

Application filed December 26, 1923. Serial No. 682,756.

My invention relates to the refining of petroleum oils and the principal object of the invention is to provide a compact apparatus by which petroleum oils or oil products may be treated to divide or fractionate same. In the refining of crude oils it is necessary to "top" the oil to separate it into a low boiling point vapor and a high boiling point residuum.

It is an object of my invention to provide an apparatus by which this separation may be quickly effected with high degree of accuracy. If it is desired to make a separation at a definite boiling point, it is very desirable that there be no substance left in the high boiling residuum which has a boiling point below this temperature, and it is further highly desirable that the low boiling point vapors contain no substances which have a lower boiling point.

My apparatus is particularly designed to accomplish a very clear cut separation of petroleum products.

A further object of the invention is to provide an apparatus which will have a large capacity and which will be compact; that is to say, an apparatus in which the various parts are mounted together as a unit and which may be operated as a unit by relatively unskilled labor.

It is a further object of the invention to provide an apparatus by which the petroleum to be treated is refluxed in such a manner as to produce a much higher percentage of volatile and therefore valuable products from a given oil than can be obtained by the conventional forms of apparatus now in use.

Further objects and advantages will be made evident hereinafter.

Referring to the drawing which is for illustrative purposes only,

Fig. 2 is a view of the anterior end of the apparatus.

Fig. 3 is a section on a plane represented by the line 3—3 of Fig. 1 looking towards the posterior end.

Figure 1:
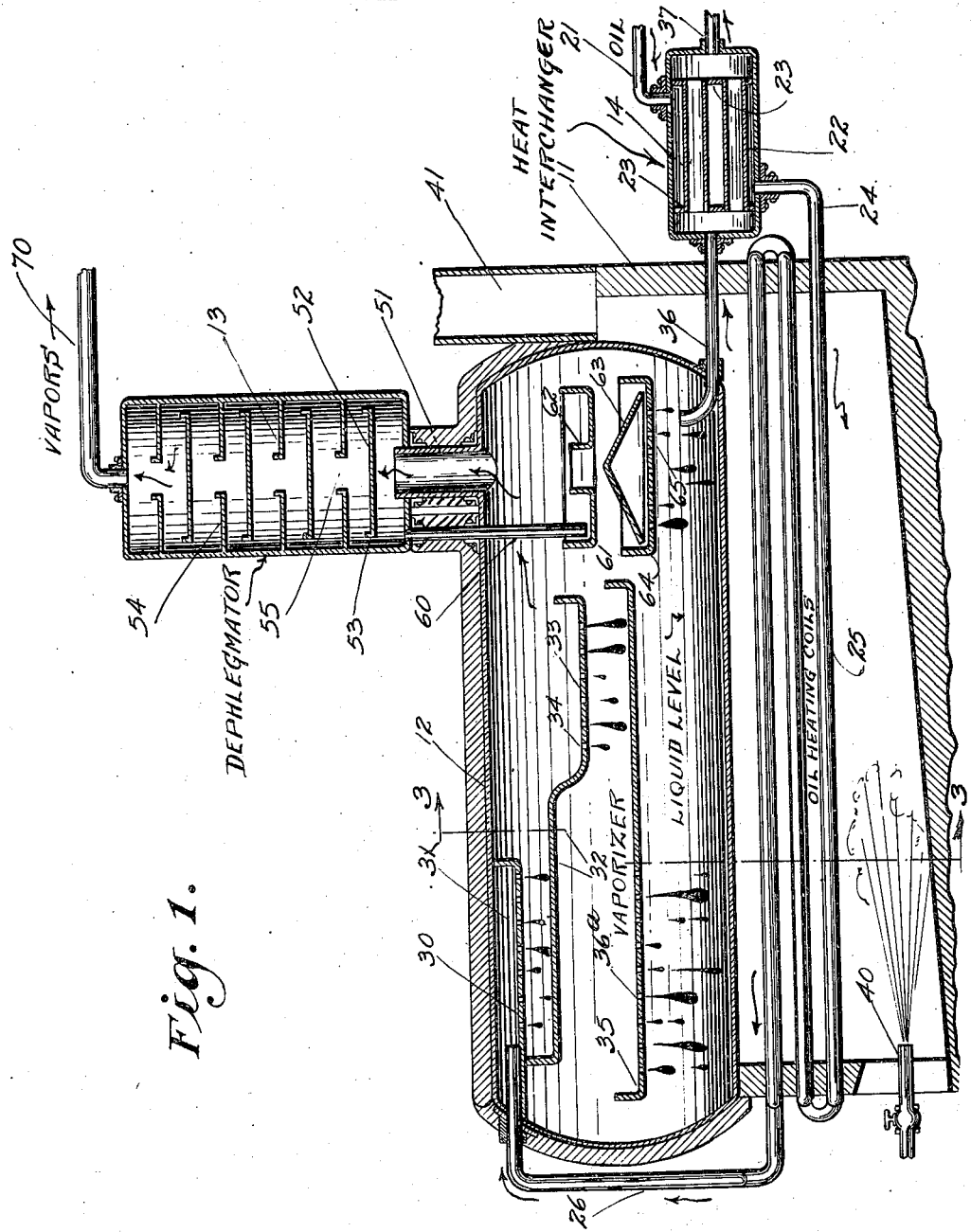
Fig. 1 is a side elevation partly in section of a preferred embodiment of my invention.

In the form of the invention illustrated I employ a furnace 11, a still 12, a dephlegmator 13 and a heat interchanger 14. This apparatus is mounted as shown to form a compact unit. The oil to be treated enters the heat interchanger 14 through a pipe 21, passing into the space around tubes 22 and between heads 23 and passing from this space through a pipe 24 into tubes 25 situated in the fire box of the furnace 11. In the tubes 25 the oil is highly heated, then passes through a pipe 26 into the interior of the still 12. The oil entering the still 12 is distributed into a primary pan 30 which is perforated as shown at 31. The perforations 31 finely divide the oil as it falls therethrough and deliver it to a secondary pan 32 which is provided with a depressed portion 33 having perforations 34. The oil from the perforations 34 is spread upon a tertiary pan 35 and is delivered through perforations 36ª therein to the anterior end of the still. A definite level of oil is maintained in the still by an outlet pipe 36 in the posterior end of the still, which connects one end of the heat interchanger 14 with the still. Oil from the still 12 is delivered through the pipe 36 into the heat interchanger 14, flowing through the tubes 22 and flowing out through a pipe 37. This oil is hereinafter called residuum and forms the desired high boiling point fraction. The hot residuum flowing through the pipe 36 and through the tubes 22 heats the incoming oil surrounding the tubes 22 and this heat interchange cools the residuum which is delivered at a reduced temperature to the pipe 37.

The interior of the furnace is fired by any convenient means such, for example, as a gas burner 40, the products of combustion being taken off through a stack 41. The oil delivered to the primary pan 30 is at a high temperature due to its having been heated in the coils 25. A portion thereof is readily vaporized in its passage over the pans 30, 33 and 35. The vapors so produced, together with the vapors from the oil in the bottom of the still, rise and pass through the vapor outlet pipe 51 into the dephlegmator 13.

This dephlegmator is provided alternately with pans 52 having an annular space 53 therearound and with pans 54 having a central opening 55. The vapor entering the dephlegmator 13 flows in a tortuous course around the outer edges of the pans 52 and through the central openings 55 of the pans 54. In their upward passage through the dephlegmator 13, the vapors are slightly cooled and are partially condensed in the pans 52 and 54. The condensates overflow in the pans, falling to the next lower pan, and are finally delivered through a pipe 60 into a pan 61 in the still 12. The condensates are maintained at a certain level in the pan 61 and are delivered through a pipe 62 to a spreader cone 63 supported above a pan 64. The pan 64 is perforated and the condensates therefrom are sprayed downwardly into the body of oil in the bottom of the still 12.

By the use of my apparatus constructed as described above, it is possible to fractionate large quantities of any petroleum oil. This oil is pumped in through the pipe 21, passing through the coils 25, and is finely divided and spread by the perforations in the pans 30, 33 and 35. It also flows over the surface of these pans so that the vapors carried therein are readily released. The interior of the still 12 being at an elevated temperature due to the fact that it contains a body of residuum in the bottom, and the bottom being heated directly through its contact with the fire chamber of the furnace, a very rapid distillation takes place. The mixed vapors delivered from the various heating surfaces and distributing surfaces inside the still pass upwardly into the dephlegmator 13 in which the higher boiling point fractions are condensed and absorbed by the condensates carried in the pans 52 and 54. These high boiling point condensates which are of such characteristics that it is not desired to take them off through the vapor outlet pipe 70, are delivered back into the still into the pans 61 and 64 where they are subjected to the action of the hot vapors in the still, being finally delivered through the perforations 65 into the hot oil in the bottom of the still. In the dephlegmator 13 any high boiling point vapors are condensed and thereafter refluxed by being passed back into the hottest portion of the still, namely, the posterior end thereof.

I have found in actual operation that by the use of my invention large quantities of low boiling point vapors may be produced from a given oil and delivered through the pipe 70 to suitable containing apparatus, not shown. My apparatus is also so constructed that it forms a compact unit having a minimum of piping with a very high efficiency. By utilizing the same furnace for heating the oil in the tubes 25 and heating the still, a very high efficiency of heat transfer is obtained. By placing the dephlegmator in the position shown, it is possible to continuously and properly reflux the oil to produce the desired product.

I claim as my invention:

1. In combination: a furnace; a still having an anterior portion and a posterior portion supported in said furnace; a pipe coil having an inlet and an outlet end supported in said furnace below said still; means for causing a combustion in said furnace; means for delivering oil to the inlet end of said pipe coil; means for delivering fluid from the outlet end of said pipe coil to said still; means in the anterior upper portion of said still for thinly spreading and finely dividing the fluid so delivered thereto; a dephlegmator directly connected to the posterior upper portion of said still; means for returning any condensates from said dephlegmator to the posterior portion of said still; means in said still for finely dividing the condensates so returned, means for withdrawing vapors from the top of said dephlegmator; and means for withdrawing residuum from the lower posterior portion of said still.

2. In combination: a furnace; a still having an anterior portion and a posterior portion supported in said furnace; a pipe coil having an inlet and an outlet end supported in said furnace below said still; means for causing a combustion in said furnace; means for delivering oil to the inlet end of said pipe coil; means for delivering fluid from the outlet end of said pipe coil to said still; means in the anterior upper portion of said still for thinly spreading and finely dividing the fluid so delivered thereto; auxiliary means for again spreading and dividing said fluid and delivering the liquid portion thereof to the anterior end of said still; a dephlegmator directly connected to the posterior upper portion of said still; means for returning any condensates from said dephlegmator to the posterior portion of said still; means in said still for finely dividing the condensates so returned, means for withdrawing vapors from the top of said dephlegmator; and means for withdrawing residuum from the lower posterior portion of said still.

3. In combination: a furnace; a still having an anterior portion and a posterior portion supported in said furnace; a pipe coil having an inlet and an outlet end supported in said furnace below said still; means for causing a combustion in said furnace; means for delivering oil to the inlet end of said pipe coil; means for delivering fluid from the outlet end of said pipe coil to said still; a perforated plate in the anterior upper portion of said still for thinly spreading and finely dividing the fluid so delivered thereto; a dephlegmator directly connected to the posterior upper portion of said still; means for returning any condensates from said dephlegmator to the posterior portion of said still; means in said still for thinly spreading and finely dividing the condensates so returned; means for withdrawing vapors from the top of said dephlegmator; and means for maintaining a constant level of liquid in the bottom of said still.

4. In combination: a furnace; a still having an anterior portion and a posterior portion supported in said furnace; a pipe coil having an inlet and an outlet end supported in said furnace below said still; and means for causing a combustion in said furnace; means for delivering oil to the inlet end of said pipe coil; means for delivering fluid from the outlet end of said pipe coil to said still; a perforated plate in the anterior upper portion of said still for thinly spreading and finely dividing the fluid so delivered thereto; an auxiliary perforated plate for again spreading and dividing said fluid and delivering the liquid portion thereof to the anterior end of said still; a dephlegmator directly connected to the posterior upper portion of said still; means for returning any condensates from said dephlegmator to the posterior portion of said still; means in said still for thinly spreading and finely dividing the condensates so returned; means for withdrawing vapors from the top of said dephlegmator; means for maintaining a constant level of liquid in the bottom of said still.

In testimony whereof, I have hereunto set my hand at Los Angeles, California, this 17th day of Dec., 1923.

HARRY H. ARMSTRONG.